Dec. 11, 1923.

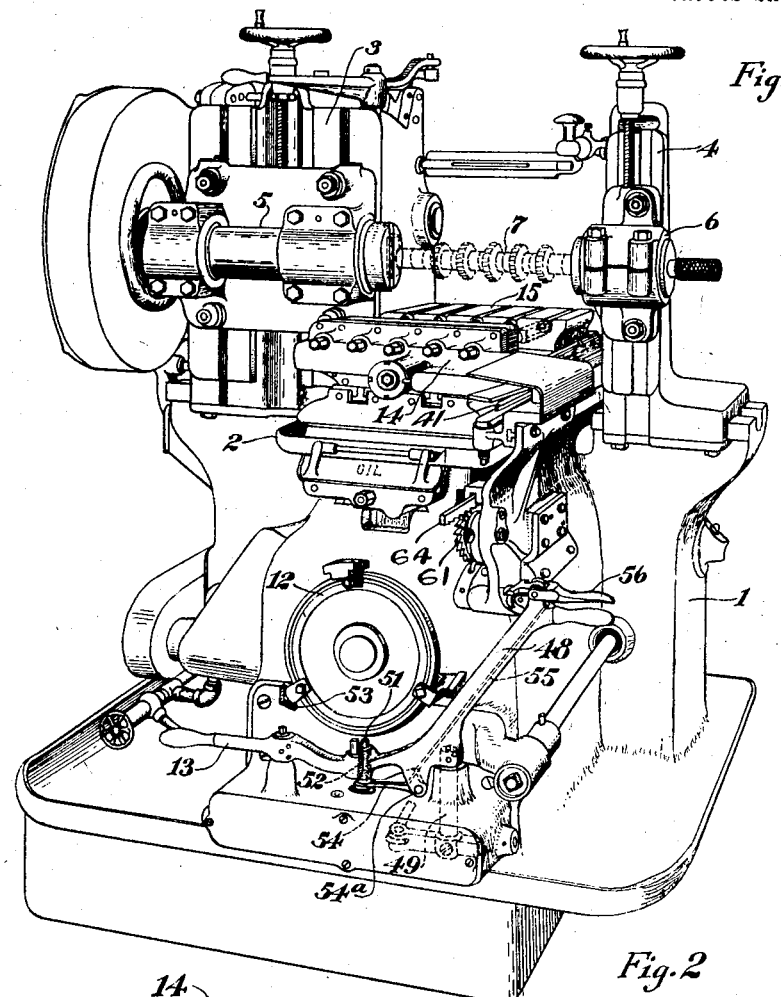

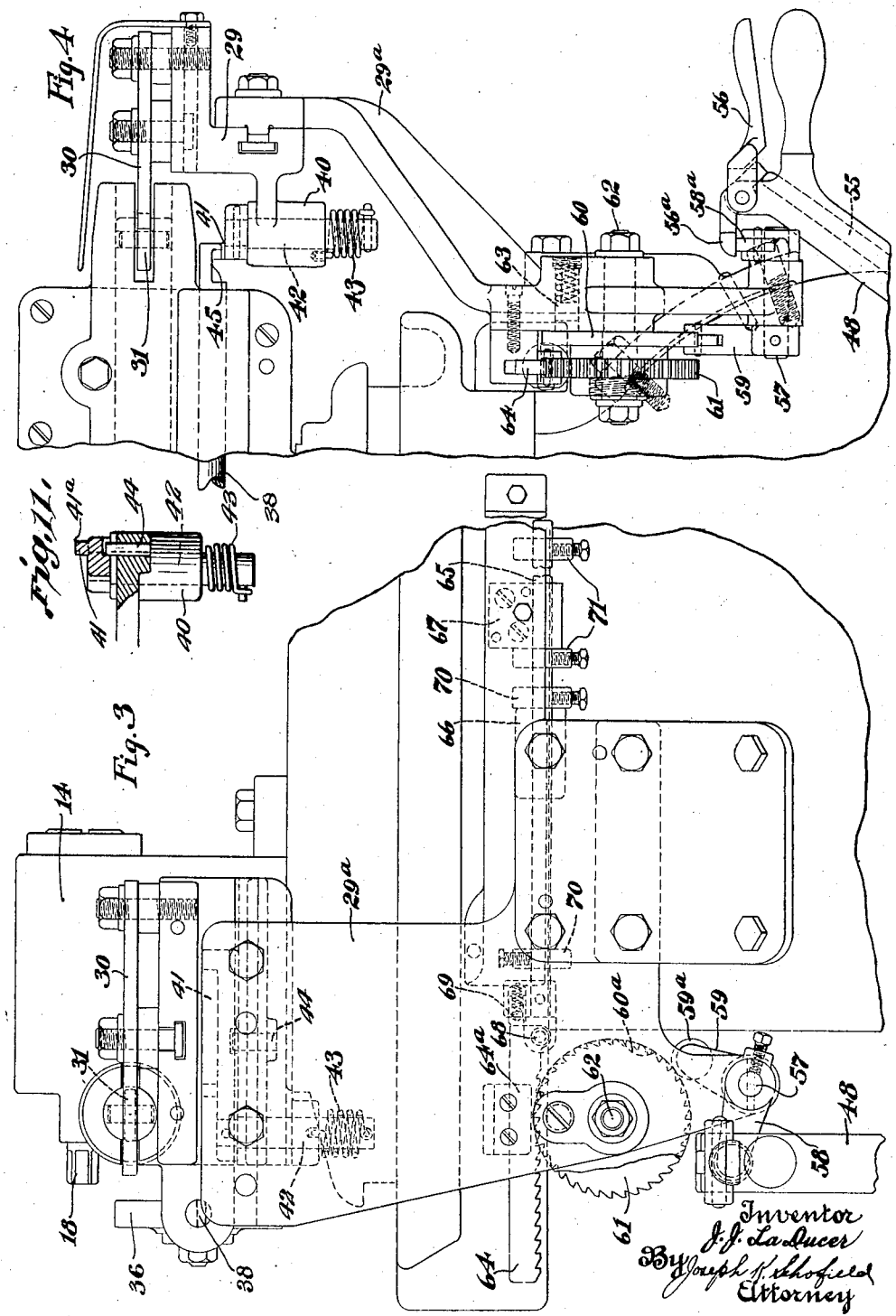

J. J. LA DUCER

MILLING MACHINE

Filed April 21, 1921

Inventor
J. J. La Ducer
By Joseph N. Schofield
Attorney

Dec. 11, 1923.

J. J. LA DUCER 1,477,178

MILLING MACHINE

Filed April 21, 1921   4 Sheets-Sheet 4

Inventor
J. J. LaDucer
By Joseph K. Schofield
Attorney

Patented Dec. 11, 1923.

1,477,178

UNITED STATES PATENT OFFICE.

JERRY J. LA DUCER, OF HARTFORD, CONNECTICUT, ASSIGNOR TO PRATT & WHITNEY COMPANY, OF NEW YORK, N. Y., A CORPORATION OF NEW JERSEY.

MILLING MACHINE.

Application filed April 21, 1921. Serial No. 463,273.

*To all whom it may concern:*

Be it known that I, JERRY J. LA DUCER, a citizen of the United States, residing at Hartford, in the county of Hartford and State of Connecticut, have invented certain new and useful Improvements in Milling Machines, of which the following is a specification.

This invention relates to milling machines and particularly to a mechanism adapting the machine for simultaneous and automatic operation on a plurality of work pieces to mill a plurality of equally spaced flutes or grooves therein. To this end the invention provides means for supporting the several pieces of work, means for simultaneously and automatically indexing the same and means for automatically stopping the operation of the machine at the completion of the final cut, and the primary object of the invention is to provide improved mechanism for performing these functions. The details of the invention and the more specific objects thereof will become apparent from the following description taken in connection with the accompanying drawings. It will be understood, however, that the disclosure herein is merely illustrative, the scope of the invention being defined in the claims appended hereto.

Referring to the figures of the drawings:

Figure 1 is a perspective view of a milling machine with the mechanism comprising the present invention applied thereto.

Fig 2 is a fragmentary plan view of the work table with connected and adjacent parts of the improved mechanism.

Fig. 3 is a side elevation thereof.

Fig. 4 is an end elevation thereof.

Fig. 11 is a detail sectional view taken on line 11—11 of Fig. 2.

Figure 5:
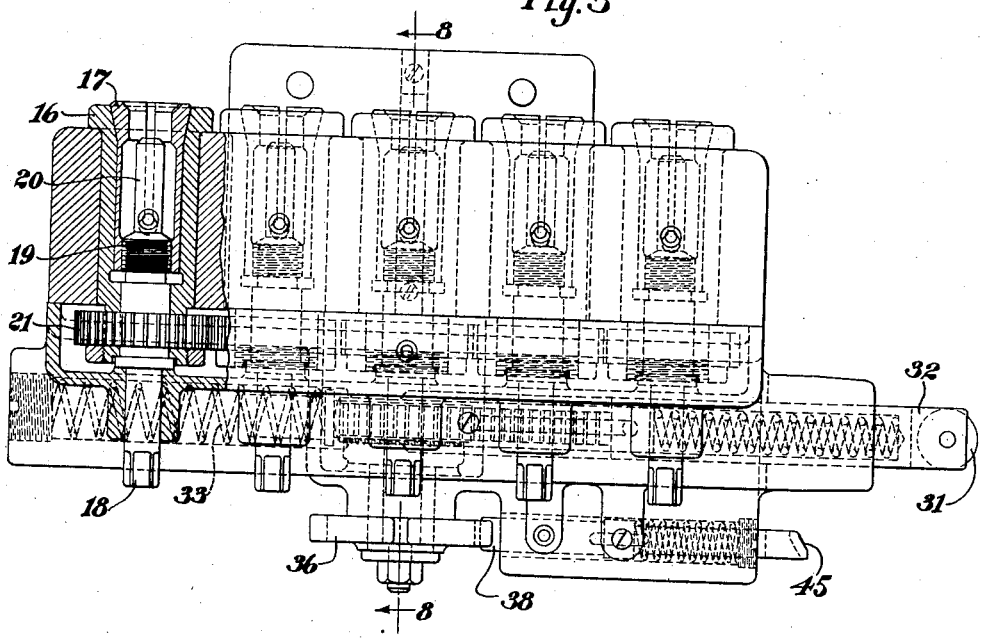
Fig. 5 is a plan view partially in section of the work-supporting headstock and illustrating part of the indexing mechanism.
Figure 6:
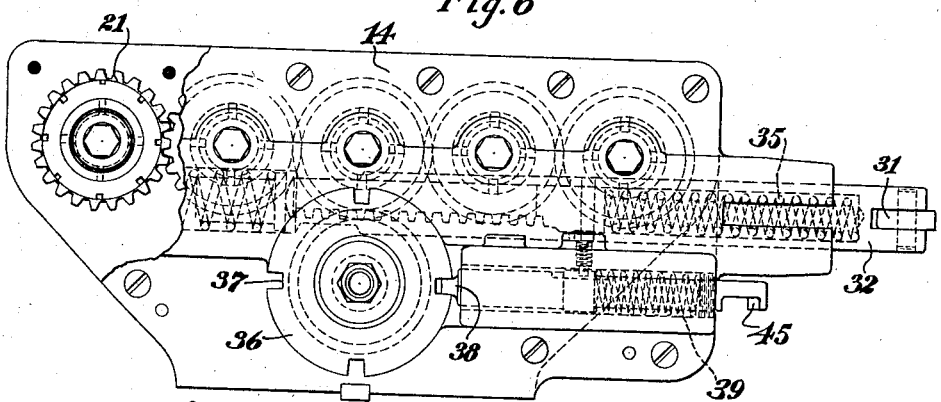
Fig. 6 is an end elevation thereof.

In milling operations wherein is involved the milling of several cuts on a single piece of work, such as the milling of a plurality of flutes or grooves on small work which must be indexed at certain periods during the cutting operation, it is very desirable that the operation of the machine be entirely automatic. In such a machine the operator is only required to remove the finished work and substitute new work therefor and a single operator may therefore attend to several machines. This invention comprises such a mechanism wherein after chucking the work and starting the machine the operator may with safety leave the machine to complete the milling operation. The machine comprises mechanism for operating simultaneously on a plurality of work pieces, for automatically indexing the several pieces and for automatically stopping the operation of the machine at the completion of the milling operation.

Referring more specifically to the drawings, 1 indicates the frame of a milling machine having a work table 2 mounted thereon. 3 indicates the headstock and 4 the footstock supporting respectively and vertically adjustable thereon the cutter spindle 5 and the spindle end-supporting bearing 6, the arbor 7 with a plurality of milling cutters thereon being shown in dotted lines in Fig. 1 as supported by the members 5 and 6. A roller 8 (Fig. 10) on the table rides in the cam groove 9 of a barrel cam 10 on a shaft 11 whereby the table is reciprocated beneath the cutters. The speed of the table is automatically controlled by dogs on a disk 12 secured to the shaft 11 and operating on a controlling lever 13. The mechanism as thus far specifically described comprises no part of the present invention and is more fully described and illustrated in Patent No. 1,231,255 to B. M. W. Hanson.

The work supporting means herein comprises a headstock 14 mounted on the table 2 and provided with a plurality of work spindles and, for certain classes of work, a tailstock 15 also mounted on the table 2 and provided with a like number of aligning tailstock spindles. Each headstock spindle comprises a sleeve 16 rotatably mounted within the headstock and a split collet chuck 17 within each sleeve. Each chuck is adapted to be drawn inwardly and clamped on the work by the rotation of a screw 18 threadedly engaging the collet at 19. A stop 20 for the work is provided in each chuck. A gear 21 is keyed to each chuck and these several gears are intermeshed whereby the indexing of one chuck will necessarily index all the chucks.

Figure 9:
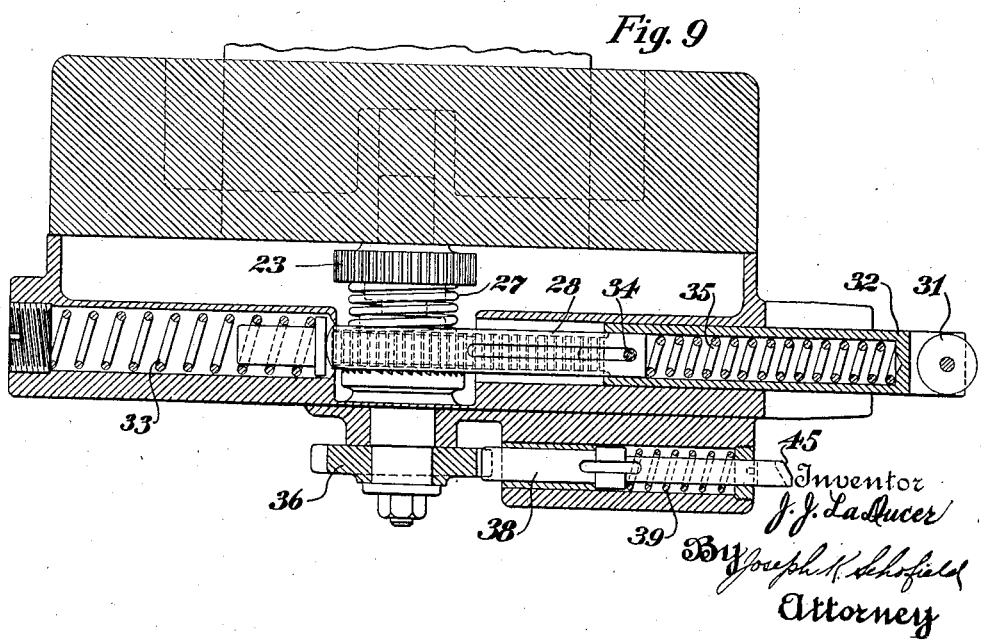
Fig. 9 is a horizontal sectional view taken on the line 9—9 of Fig. 7.

The indexing means preferably comprises a shaft 22 mounted in the headstock 14 and having a gear 23 keyed thereto and meshing with one of the gears 21. A second gear 24 is loosely mounted on the shaft 22 and is adapted to turn the shaft in one direction through a bushing 25 keyed to the shaft and cooperating one-way ratchet teeth 26 on the engaging faces of the bushing and gear 24. A spring 27 between the gears 23 and 24 serves to normally hold the ratchet teeth in engagement. The gear 24 is engaged by a rack 28 adapted to rotate the gear as the rack reciprocates. Adjustably supported on a bracket 29 on the machine frame is a plate or cam 30 adapted to be engaged by a roller 31 on the part 32 of the rack plunger as the table reciprocates and to thereby reciprocate the rack in an indexing direction, a spring 33 being adapted to return the plunger to its outward position. As illustrated the plunger comprises a tubular member 32 and the rack 28 having a pin and slot connection 34 therebetween, a spring 35 within the tubular member serving to normally hold the parts in the relative position illustrated in Fig. 9. The function of this resilient mounting of the rack will hereinafter appear.

The shaft 22 and thereby the work spindles are locked in working position by means of a disk 36 keyed to the shaft and provided with a plurality of equal spaced notches 37 adapted to be engaged by a locking plunger 38 normally held against the disk by means of a spring 39. Supported on an extension 40 of the bracket 29 is an arm comprising a cam 41 pivoted at 42. A spring 43 on the pivot 42 normally holds the arm and cam 41 swung inwardly toward the table against a stop pin 44 seated in the extension 40 beneath the cam arm. In operation the cam 41 is adapted to engage a shoulder 45 on the end of the locking plunger 38 just prior to the indexing operation and to withdraw the plunger from its notch 37. As illustrated in Fig. 4, the bracket 29 is adjustable to different operating positions along the bracket 29$^a$.

Figure 10:
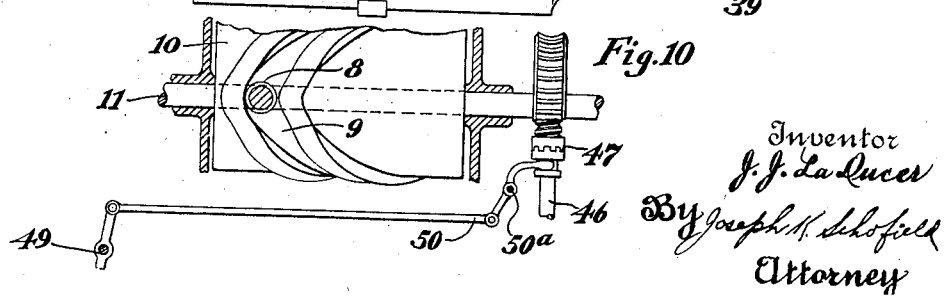
Fig. 10 is a fragmentary view illustrating the table reciprocating means and a portion of the controlling mechanism thereof.
Figure 7:
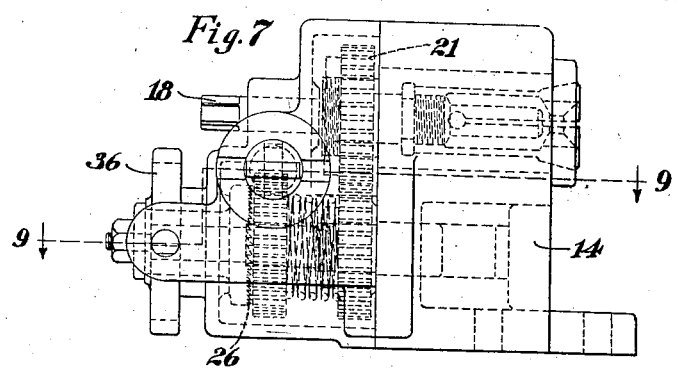
Fig. 7 is a side elevation thereof.
Figure 8:
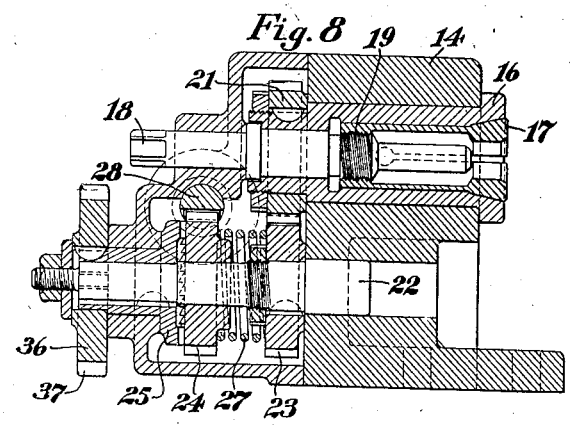
Fig. 8 is a vertical longitudinal sectional view taken on the line 8—8 of Fig. 5.

The automatic stop mechanism whereby the machine is stopped at the completion of the milling operation is shown in Figs. 1, 3, 4, and 10. The table reciprocating cam 10 is operated through a worm and worm wheel connection from a driving shaft 46 and controlled by a clutch 47. A hand lever 48 pivoted at 49 serves through a link and bell crank connection 50 pivoted at 50$^a$ to operate the clutch. When the clutch is engaged, as shown in Fig. 10, a pin 51 on the end of the lever 48, normally held in an upward position by a spring 52, is adapted to be engaged by a cam 53 on the cam disk 12 to swing the lever in a left hand direction and disengage the clutch. The pin is adapted to be held in a downward position out of the path of movement of the cam by means of a bell crank 54 pivoted at 54$^a$ and engaged by a plunger rod 55 engaged at its upper end by a handle 56. Mechanism for holding the pin in this position until the table has made a predetermined number of reciprocations is mounted on the bracket 29$^a$. A shaft 57 having arms 58 and 59 at the opposite ends thereof is mounted in the bracket. A roller 58$^a$ on the arm 58 is adapted to engage an extension 56$^a$ of the handle 56 and roller 59$^a$ on the arm 59 is adapted to ride on the periphery of the disk 60 and to drop into a depression 60$^a$ therein when such depression comes opposite the roller. The disk 60 and the ratchet wheel 61 are mounted on a shaft 62 in the bracket 29$^a$. A spring pressed plunger 63 rides frictionally against the disk and thereby prevents idle movement of the disk and ratchet wheel. A ratchet bar 64 provided with teeth engaging the teeth of the ratchet wheel extends through a guide 64$^a$ and is adapted to be reciprocated by the table. An operating rod 65 extends through a bracket 66 on the machine frame and through a bracket 67 on the table and is pivoted to the ratchet bar at 68, a spring pressed plunger 69 being adapted to hold the ratchet bar down in engagement with the ratchet wheel. A pair of adjustable stops 70 mounted on the rod are adapted to engage opposite sides of the bracket 66 and thereby limit the reciprocation of the rod. A pair of adjustable stops 71 also mounted on the rod are adapted to be engaged by the opposite sides of the bracket 67 whereby the rod is reciprocated by the bracket alternately coming into engagement with the stops.

The operation of the machine is as follows: Assuming that the work has been chucked and the table is in its forward position with the cutters over the tailstock, the operator throws in the clutch 47 by means of the lever 48 whereupon the table moves in the cutting direction, rearwardly in Fig. 1. The ratchet bar is moved rearwardly with the table a part of the table stroke, the extent of movement of the rod and ratchet bar depending on the position of the stops 70 and 71 on the rod 65. This movement of the ratchet bar rotates the ratchet wheel 61 and the disk 60 whereupon the roller 59$^a$ is forced out of the depression 60$^a$ and rides on the periphery of the disk, whereby the pin 51 is held out of the path of movement of the clutch disengaging cam 53. Upon the reverse movement of the table, the ratchet bar ratchets idly over the ratchet wheel. During the latter operation of the table movement in the forward direction, the cam 41 engages the shoulder 45 of the rack plunger 38 and withdraws the same from locking engagement with the notched disk 36. Upon the continued movement of the table the roller 31 engages the cam 30 whereupon the rack plunger 28 is moved and rotates the gear 24 to perform the indexing operation. Before the completion of the stroke of the plunger 28, the locking plunger rides off the end of the cam 41 and engages the periphery of the disk 36 and drops into the next notch 37. The spindles and the mechanism connected therewith, including the rack 28, are thereby locked against any further movement. The spring 35 within the rack plunger is adapted to compress to permit continued movement of the roller 31 along the cam 30. During the movement of the table in the rearward direction, shown by the arrow in Fig. 2, the roller 31 and the shoulder 45 of the plunger 38 engage the inner face 41$^a$ of the cam 41. This engagement forces the cam outwardly against the action of the spring 43 and the rack 28 and plunger 38 partake of no longitudinal movement. During this rearward movement of the table, the rack 28 is moved back to its original position by means of the spring 33, the spring 27 yielding to permit the disengagement of the ratchet teeth 26. It will, therefore, be seen that the work is indexed at each forward reciprocation of the table and that the automatic stopping mechanism is given a slight definite movement at each rearward reciprocation of the table. After a predetermined number of table reciprocations, four being illustrated in the drawings, the depression 60$^a$ of the disk comes opposite the roller 59$^a$ whereupon the roller drops into the depression and the machine is stopped by the cam 53. It will be understood that by substituting a locking disk having any desired number of notches therein and by changing the throw of the ratchet bar 64 any desired number of flutes or grooves may be cut in the work.

What I claim is:

1. In a metal working machine comprising a frame, a reciprocating table and a work spindle rotatably mounted on the table, an indexing mechanism for the spindle comprising the combination of a longitudinally movable plunger operatively connected to the spindle, a member on the frame adapted to be engaged by the plunger during the reciprocation of the table in one direction whereby the plunger is moved longitudinally to index the spindle after each cutting reciprocation, and means for limiting the indexing movement of the spindle and for holding the spindle locked during the cutting operation.

2. In a metal working machine comprising a frame, a reciprocating table and a work spindle rotatably mounted on the table, an indexing mechanism for the spindle comprising the combination of a pinion operatively connected to the spindle, a rack having a plurality of teeth thereon engaging the pinion, a member on the frame adapted to operate the rack as the table reciprocates in one direction whereby the pinion is rotated to index the spindle after each cutting reciprocation, and means for holding the spindle locked during the cutting operation.

3. In a metal working machine comprising a frame, a reciprocating table and a work spindle rotatably mounted on the table, an indexing mechanism for the spindle comprising the combination of a shaft operatively connected to the spindle, a pinion loosely mounted on the shaft, a one-way ratchet connection between the pinion and shaft, a rack having a plurality of teeth thereon engaging the pinion, a member on the frame adapted to operate the rack and pinion and the shaft and spindle through the ratchet connection as the table reciprocates in one direction whereby the spindle is indexed after each cutting reciprocation, and means comprising a notched disk on the shaft and a plunger for engaging the notches for holding the spindle locked during the cutting operation.

4. In a metal working machine comprising a frame, a reciprocating table and a work spindle rotatably mounted on the table, an indexing mechanism for the spindle comprising the combination of a pinion operatively connected to the spindle, a rack having a plurality of teeth thereon engaging the pinion, a member on the frame adapted to operate the rack as the table reciprocates in one direction whereby the pinion is rotated to index the spindle after each cutting reciprocation, means comprising a notched disk operatively connected to the spindle and a plunger normally held by spring pressure in engagement with the disk and adapted to engage the notches therein for holding the spindle locked during the cutting operation, and means on the frame for automatically withdrawing the plunger from engagement with a notch just prior to the indexing movement of the spindle.

5. In a metal working machine comprising a frame, a reciprocating table and a work spindle rotatably mounted on the table, an indexing mechanism for the spindle comprising the combination of a pinion operatively connected to the spindle, a lineally movable rack operatively engaging the pinion, a cam on the frame adapted to operate the rack as the table reciprocates in one direction whereby the pinion is rotated to index the spindle after each cutting reciprocation, means comprising a notched disk operatively connected to the spindle and a plunger normally held by spring pressure in engagement with the disk and adapted to engage the notches therein for holding the spindle locked during the cutting operation, and means on the frame for automatically withdrawing the plunger from engagement with a notch just prior to the indexing movement of the spindle, the last named means being adapted to release the plunger during the indexing movement whereupon the plunger engages the disk and drops into one of the notches therein.

6. In a metal working machine comprising a frame, a reciprocating table and a work spindle rotatably mounted on the table, an indexing mechanism for the spindle comprising the combination of a lineally movable resilient plunger operatively connected to the spindle, a member on the frame adapted to be engaged by the plunger during the reciprocation of the table in one direction whereby the plunger is moved longitudinally to index the spindle after each cutting reciprocation, and means for limiting the indexing movement of the spindle and for holding the spindle locked during the cutting operation, the resilient means within the plunger affording a lost motion connection between the spindle and the said member whereby to allow for the continued movement of the plunger after the locking of the spindle has taken place.

7. In a machine of the class described, the combination of a base, a work table slidably mounted thereon, a plurality of work spindles rotatably mounted on the table, a cam on the base, means on the table operated by the cam for rotatably indexing the spindles during the backward stroke of the table, means providing for an adjustment of the cam whereby to vary the indexing movement, and means for holding the spindles locked during the cutting operation.

8. In a machine of the class described, the combination of a base, a work table slidably mounted thereon, a plurality of work spindles rotatably mounted on the table, means including a gear on each spindle for operatively connecting the spindles together, a cam on the base, means on the table operated by the cam for rotatably indexing the spindles during the backward stroke of the table, means providing for an adjustment of the cam whereby to vary the indexing movement, and means for holding the spindles locked during the cutting operation.

9. In a machine of the class described, the combination of a base, a work table slidably mounted thereon, a plurality of work spindles rotatably mounted on the table, means including a gear on each spindle for operatively connecting the spindles together, a cam on the base, a toothed element on the table operatively connected with the spindles and adapted to be operated by the cam for rotatably indexing the spindles during the backward stroke of the table, means providing for an adjustment of the cam whereby to vary the indexing movement of the element, means for holding the spindles locked during the cutting operation, and means for automatically disengaging the locking means prior to the indexing operation.

10. In a milling machine, the combination of a reciprocatory table, means for reciprocating the table, a movable element on the machine frame, an element reciprocated by the table and adapted to slightly move the first element at each table reciprocation, and means controlled by the said first element for disengaging the table operating means at the end of a predetermined number of reciprocations.

11. In a milling machine, the combination of a reciprocatory table, means for reciprocating the table, a rotary element on the machine frame, an element reciprocated by the table and adapted to slightly rotate the first element at each table reciprocation, and means controlled by the rotary element for disengaging the table operating means at the end of a predetermined number of reciprocations.

12. In a milling machine, the combination of a reciprocatory table, means for reciprocating the table, a ratchet wheel on the machine frame, a cooperating ratchet bar operated by the table and adapted to slightly rotate the ratchet wheel at each table reciprocation and means controlled by the ratchet wheel for disengaging the table operating means at the end of a predetermined number of reciprocations.

13. In a milling machine, the combination of a reciprocatory table, means for reciprocating the table, a ratchet wheel on the machine frame, a cooperating ratchet bar operated by the table and adapted to slightly rotate the ratchet wheel at each table reciprocation, and means controlled by the ratchet wheel for disengaging the table operating means at the end of a predetermined number of reciprocations, and means for varying the working stroke of the ratchet bar.

14. In a milling machine, the combination of a reciprocatory table, means for reciprocating the table, means including a rotary disk and mechanism cooperating therewith for disengaging the table reciprocating means at one rotary position of the disk, an element reciprocated by the table and adapted to slightly rotate the disk a fraction of a full rotation at each table reciprocation, and means for varying the working stroke of the element.

15. In a milling machine, the combination of a reciprocatory table, means for reciprocating the table, a rotary disk having a depression in the periphery thereof, an element riding on the periphery of the disk, the table operating means being in an operative position when the element is riding on the periphery of the disk, means adapted to disengage the table operating means when the element drops into the depression of the disk, a member for slightly rotating the disk at each table reciprocation, and means for varying the amount of such rotative movements.

16. In a milling machine, the combination of a reciprocatory table, means for reciprocating the table, a clutch for engaging and disengaging the reciprocating means, means normally engaged by a movable part of the machine for disengaging the clutch, and means for holding the second named means out of the path of movement of the said movable part until the table has made a predetermined number of reciprocations.

17. In a milling machine, the combination of a reciprocatory table, means for reciprocating the table, a clutch for engaging and disengaging the reciprocating means, a cam disk rotated by the table reciprocating means, a clutch operating lever having an element thereon normally in the path of movement of a cam on the cam disk for disengaging the clutch, and means for holding the element out of the path of movement of the cam until the table has made a predetermined number of reciprocations.

18. In a milling machine, the combination of a reciprocatory table, means for reciprocating the table, a clutch for engaging and disengaging the reciprocating means, a cam disk rotated by the table reciprocating means, a clutch operating lever having an element thereon normally in the path of movement of a cam on the cam disk for disengaging the clutch, mechanism comprising a movable member and an element engaging the same to normally hold the first element out of the path of movement of the cam until the table has made a predetermined number of reciprocations, and means for slightly moving the member a predetermined amount at each table reciprocation.

19. In a milling machine, the combination of a reciprocatory table, means for reciprocating the table, a clutch for engaging and disengaging the reciprocating means, a cam disk rotated by the table reciprocating means, a clutch operating lever having an element thereon normally in the path of movement of a cam on the cam disk for disengaging the clutch, mechanism comprising a rotary disk having a depression therein and an element riding thereon to normally hold the first element out of the path of movement of the cam until the second element reaches and drops into the depression after a predetermined number of reciprocations of the table, and means for slightly rotating the second disk at each table reciprocation.

20. In a milling machine, the combination of a reciprocatory table, means for reciprocating the table, a ratchet wheel and disk operatively connected together, a ratchet bar operated synchronously with the table reciprocation and operatively engaging the ratchet wheel, means for disengaging the table reciprocating means, and means riding on the periphery of the disk and adapted to be controlled thereby to permit the table disengaging means to function only after a predetermined number of reciprocations of the table.

21. In a milling machine, the combination of a reciprocatory table, means for reciprocating the table, a clutch for engaging and disengaging the reciprocating means, a cam moved by the table reciprocating means, a clutch operating lever having a pin thereon normally in the path of movement of the cam for disengaging the clutch, a ratchet wheel and disk operatively connected together, a ratchet bar operated by the table reciprocation and operatively engaging the ratchet wheel, and means riding on the disk and normally holding the pin out of engagement with the cam and adapted after a predetermined number of reciprocations of the table to permit the pin to move into the path of movement of the cam whereby the clutch is disengaged.

In testimony whereof, I hereto affix my signature.

JERRY J. LA DUCER.